3,259,472
FRACTION SEPARATION OF AQUEOUS RARE EARTHS USING AMINES
Andrew C. Rice, Reno, Nev., assignor to the United States of America as represented by the Secretary of the Interior
Filed Oct. 30, 1961, Ser. No. 148,775
10 Claims. (Cl. 23—312)

The invention herein described and claimed may be manufactured and used by or for the Government of the United States of America for governmental purposes without the payment of royalties thereon or therefor.

This invention relates to a method for fractionating and separating rare earth values from aqueous solutions, and more particularly to a method employing higher amines to this end.

It is well known that the rare earth elements are difficult to separate. In the past tedious fractional crystallization methods have been employed. More recently, ion exchange methods have been used for this purpose. Solvent extraction techniques have also been proposed. However, no liquid-liquid solvent extraction method employing readily available amines has been devised up to now, for the satisfactory separation and fractionation of rare earths.

A concise summary of the properties, and the methods of separation employed heretofore is to be found in the article entitled "Rare Earth Metals" in the Encyclopedia of Chemical Technology, vol. 11, pages 503 to 506 (1953), New York, Interscience Enclyclopedia, Inc. While the term "rare earths" strictly speaking refers to the oxides, it is commonly used for the elements as well.

Rare earths include the elements from lanthanum (atomic number 57) to lutetium (atomic number 71), commonly known as the lanthanide series, together with yttrium (atomic number 39). Although the latter is not one of the rare earth elements, it is always found in nature associated with them, they exhibit the same chemical characteristics. The rare earths are divided into a lighter atomic weight cerium group, which takes in the members from lanthanum to europium, and a heavier group encompassing terbium to lutetium, together with yttrium (which resembles this latter group more closely); and is known as the yttrium, or sometimes, the ytterbium group. In addition, scandium (atomic number 21) is sometimes grouped as a rare earth.

To obtain a fractional separation of rare earth elements from a solution, the percentage of each rare earth element transferred to the added extractant must be appreciably different. Quantitatively, this is determined by the distribution coefficient (K) which is the ratio of the concentration of an element in the extract phase divided by the concentration of the elements in the raffinate phase. Where two elements are present and concentrations are different in the extract and raffinate phases, this difference may be employed to separate them. This separation factor, $\beta$, is determined by the ratio of the two distribution coefficients, i.e., $$\beta = \frac{K_1}{K_2}$$

where $K_1$ and $K_2$ are the respective distribution coefficients of the two elements. Usually, the ratio is arranged so that $\beta$ is greater than 1.

We have found that by employing certain higher amines together with organic diluents, in liquid-liquid extraction of rare earth in an aqueous acid solution, satisfactory distribution coefficients (K) and separation factors ($\beta$) are obtained, and fractionation and separation of the rare earths may be achieved.

In its broadest terms, the process comprises extracting an aqueous solution containing rare earth elements with a solution of a higher amine in a water insoluble, relatively inert, organic liquid diluent at a pH ranging from about neutral to highly acid to form extract and raffinate phases, and then recovering the rare earths from the extract and raffinate phases by stripping or precipitation.

The main object of this invention is to provide a method for separating rare earths from an aqueous solution rapidly and inexpensively employing liquid-liquid separation.

A further object is to provide a method to separate rare earths from an aqueous sulfuric acid solution using liquid-liquid separation wherein an extractant liquid consisting of a higher amine dissolved in a non-reactive organic solvent is employed.

A further object is to provide a method for liquid-liquid separation of rare earths from aqueous sulfuric acid solutions employing higher primary amines having at least 12 carbon atoms.

Yet a further object is to provide a method for the liquid-liquid extraction of rare earth from an aqueous acid solution employing a higher aliphatic primary amine and in the presence of sulfate ions.

Further objects will become apparent from the rest of the disclosure.

In accordance with my invention a solution of the rare earth elements, such as that prepared by the treatment of monazite sand with sulfuric acid, is extracted with a solution of higher amines in a water immiscible organic solvent. The extraction may be batchwise, or continuous. Intimate contact between the organic phase and aqueous phases is provided by any of the usual means known to the art such as vigorous mixing, or countercurrent flow over suitable baffles, etc. After the mixing the layers are allowed to separate, and are removed for further processing. The organic layer may be stripped of rare earth values by treatment with hydrochloric acid, while the aqueous phase may be treated batchwise with additional amine solution for further solvent extraction, recycled to the extraction stage, or treated chemically to recover the rare earth, as by precipitation with oxalic acid.

Solvent extraction takes place under about neutral to strongly acid conditions. The preferred range being from about 1.0 to 7.0.

In general, long chain amines having the formula $R_1R_2R_3N$, wherein $R_1$ is an alkyl group having at least 12 carbon atoms, $R_2$ is H or alkyl, $R_3$ is H or mononuclear aromatic have been found to be useful in the process. Among the amines which may be employed are the commercially available long chain aliphatic amines such as Armeen 12D,[1] Armeen CD,[1] Amine 21F81 [2] etc.

I have found a Primene 81-R[3], Primene JM-T[3], and N-benzylheptadecylamine (BHDA), a secondary amine to be particularly effective. Some of the commercially available higher amines form precipitates in the organic phase with the rare earths, and are not as desirable since steps must be taken to clear the phase. In general, primary amines give better results than the secondary and tertiary amines, although there are exceptions such as BHDA, for example.

The amine extractant is formed by dissolving the amine in a water immisicible solvent which is compatible with and substantially inert to the other components in the system. The proportion of amine in organic diluent may range from 0.1 to 0.5 molar.

Kerosene was generally employed as the amine diluent since it is cheap and very satisfactory. However, other hydrocarbon solvents such as aromatic and aliphatic fractions from the petroleum industry, having a boiling point range of 60° to 300° C., halogenated hydrocarbon, ethers, ketones, various alcohols, etc., may be employed. Among those solvents which have proved useful are acetophenone, anisole, benzene, benzyl ether, carbon tetrachloride, chloroform, diisobutyl alcohol, dimethyl sulfide, ethyl ether, hexane, isopropyl ether, octene, toluene, and trichloroethylene.

It is obvious from the above list that the solvents which may be employed can vary widely in chemical structure, so long as they meet the requirements of being water immiscible, non-reactive, do not depress the extraction coefficient, dissolve the amine employed and any of its salts with the anion encountered in the extraction and stripping steps, and has a viscosity and density which make for ready separation.

Usually the rare earths are in a relatively dilute solution in the acid medium, in a range which may vary from 0.005 to 0.05 molar. The ratio of aqueous to organic phases in the extraction step may vary widely. A mol ratio of amine to rare earth of 10:1 is usually satisfactory, and the concentration af amine in diluent and rare earth in acid solvent may be controlled to give any desired dilution. However, if the percentage of amine in its solution with organic solvent is too low, there may be no extraction taking place and hence no separation. In this event, a more concentrated solution is indicated. If the concentration of rare earths is too low, this can be rectified by blending with more concentrated solutions, or by evaporation of some of the solution. On the other hand, too high a concentration of rare earths may result in almost complete extraction of all the rare earths present and hence there would be no separation. From a consideration of these factors, it is apparent that a judicious balance between the volumes of organic to an aqueous phase, the concentration of amine in diluent, the concentration of rare earth, and the pH of the aqueous solution must be maintained to achieve separation. Also, the optimum pH varies with different rare earths and amines. These conditions may be determined by preliminary tests in any given situation, as is apparent to those skilled in the art.

Although the amine is generally dissolved in an organic solvent, in the case of some amines, Primene 81-R for example, an alternative procedure is available since it becomes water soluble when dilute sulfuric acid is added. The amine is dissolved in relatively dilute sulfuric acid, and the aqueous solution is then added to the rare earth solution, together with the organic solvent. The amine-rare earth complex which forms is extracted by the organic solvent.

The effect of variation of pH, concentration of amine and concentration of rare earths are shown in the drawing wherein.

EXTRACTION OF RARE EARTHS

Rare earth solutions employed in these experiments consisted of 99%+ purity sulfate solutions from which excess acid was removed by fuming. The amines were dissolved in water immiscible, organic solvents before contacting them with the rare earth solution. All tests were conducted at room temperature and atmospheric pressure.

The amine solution and the rare earth sulfate aqueous solution were contacted by shaking into a separatory funnel in a mechanical shaker. The starting volumes of the two phases were adjusted to give equal amounts (30 ml.) of the final organic and aqueous phases. Dilute sulfuric acid was added at intervals to maintain the desired pH. After reaching a steady state in the pH value the samples were shaken for 3 to 4 minutes. Additional shaking produced no significant variation in results.

After standing for one hour, the separated phases were drawn from the separatory funnel, then volumes measured, and the final pH of the aqueous phase determined. Rare earth concentration in the aqueous phase was determined by oxalate precipitation.

Figure 2:
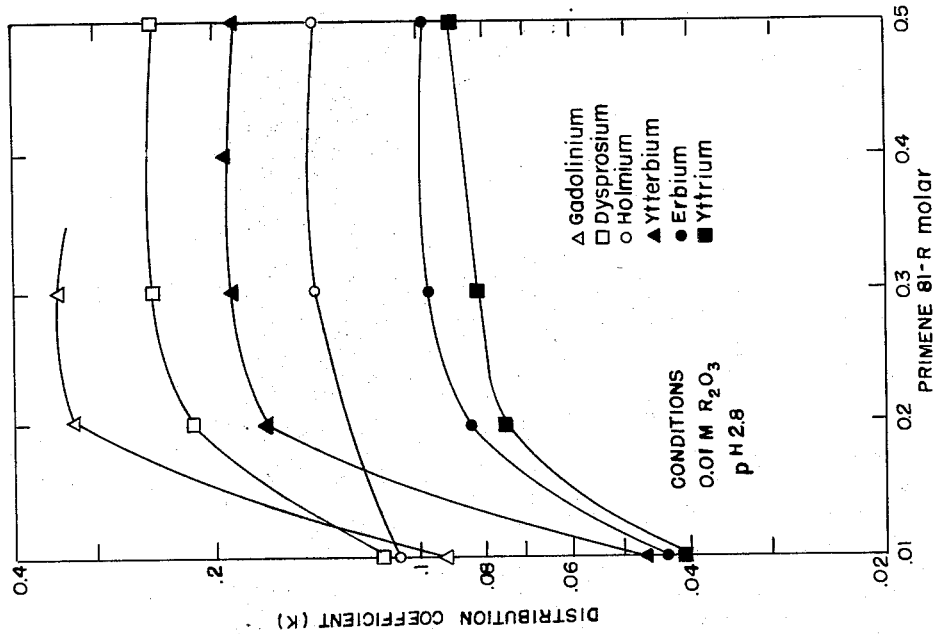
FIG. 2 is a graph showing the effect of changing the concentration of Primene 81-R on the yttrium group.
Figure 1:
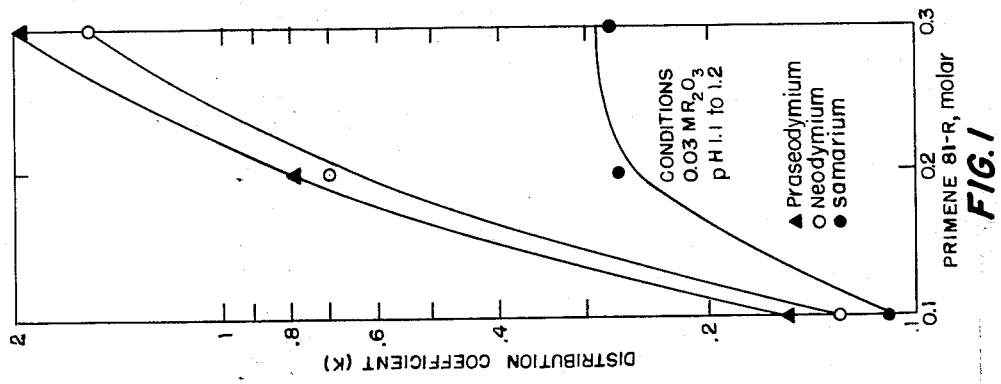
FIG. 1 is a graph showing the effect of changing the concentration of Primene 81-R on various rare earths of the cerium group.

FIGS. 1 and 2 show that an increase in Primene 81-R concentration results in an increase in distribution coefficient until an excess of amine is present. Concentrations of Primene 81-R greater than 0.3 molar are generally undesirable, as emulsion and precipitation problems are likely at such higher concentrations.

Figure 3:
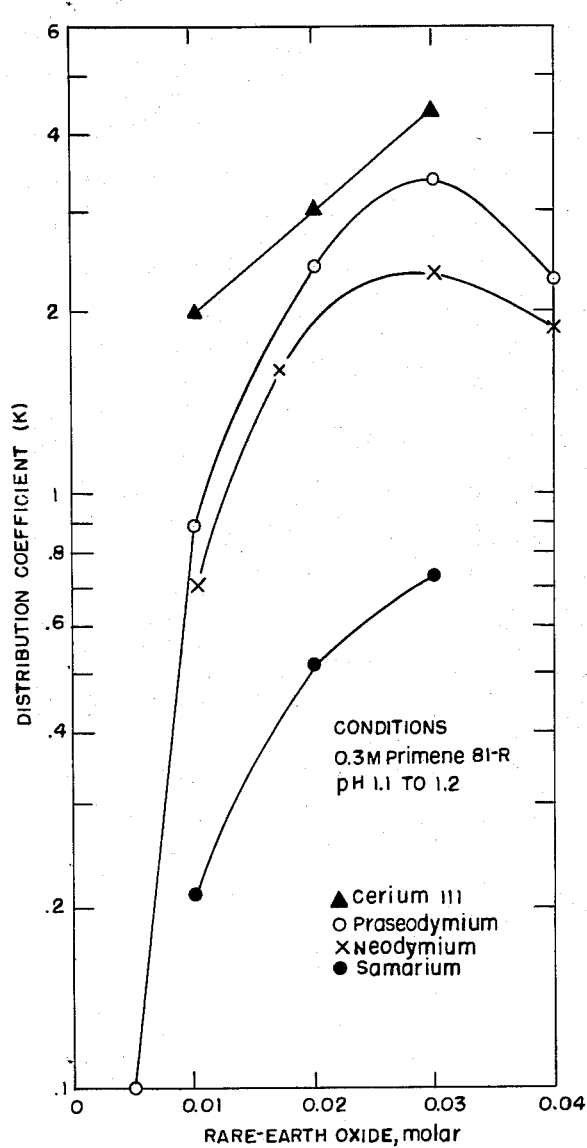
FIG. 3 is a graph showing the effect of changing the rare earth concentration of various members of the cerium group.
Figure 4:
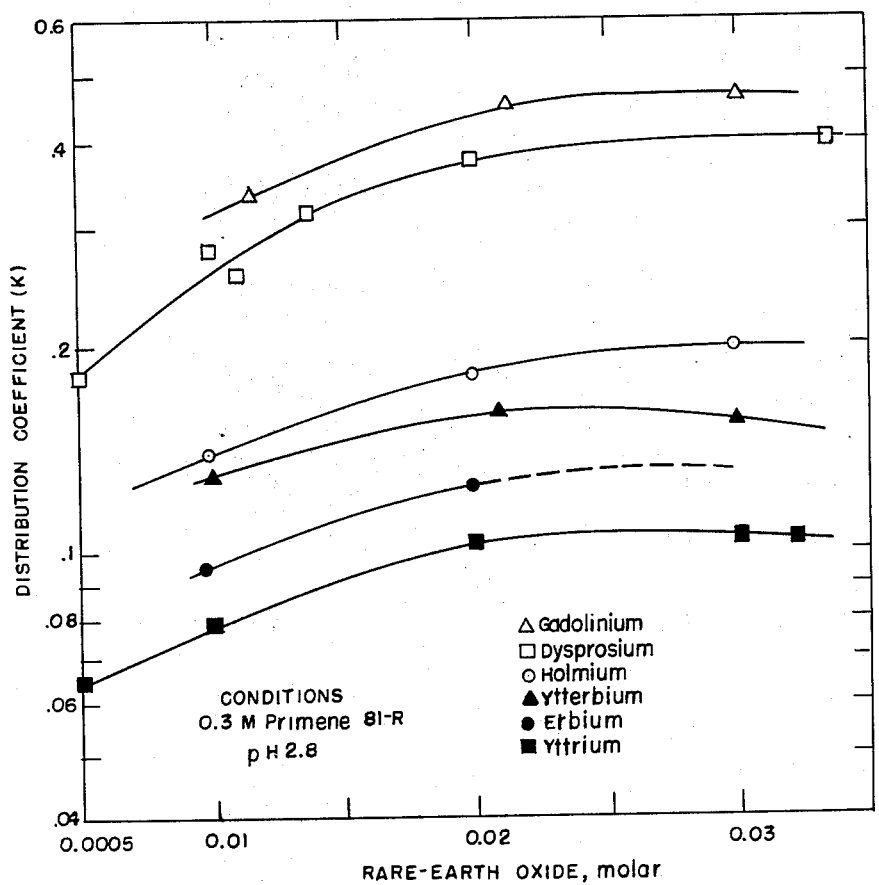
FIG. 4 is a graph showing the effect of changing rare earth concentrations of various members of the yttrium group.

FIGS. 3 and 4 show that a change in concentration of the yttrium group results in a lesser change in the distribution coefficient than the corresponding changes in the cerium group.

Figure 5:
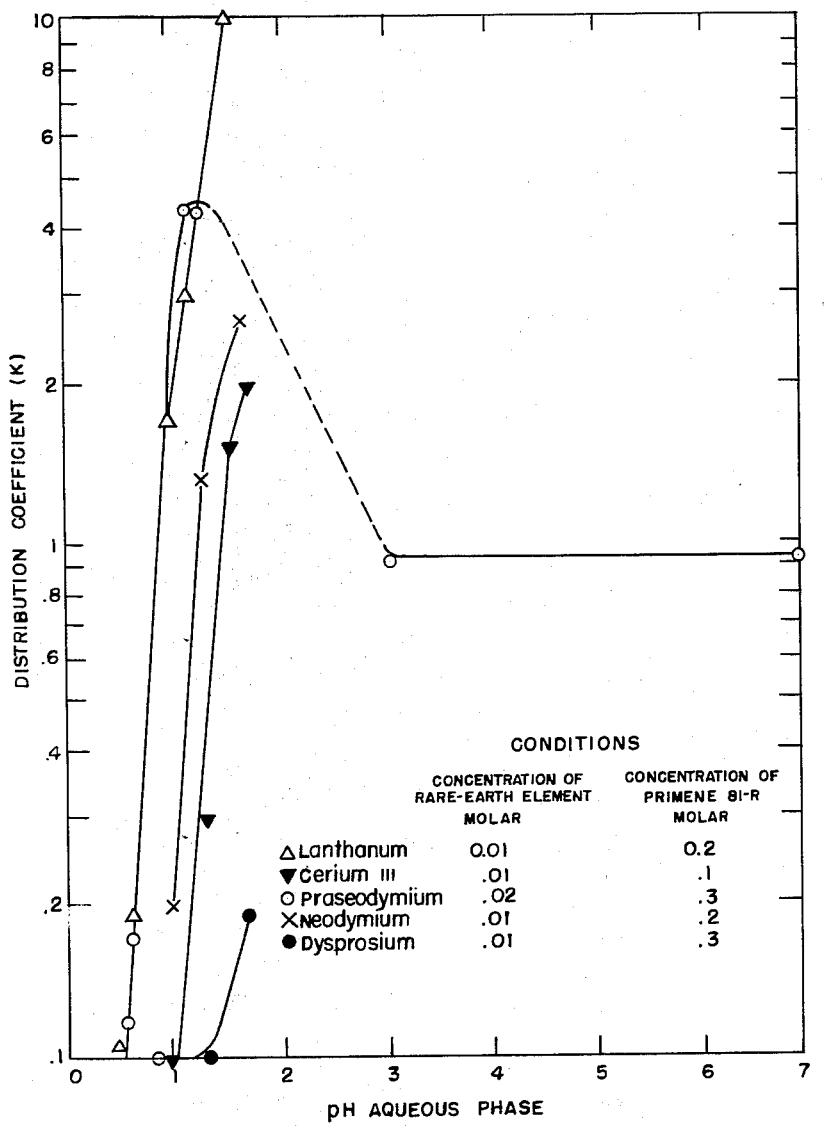
FIG. 5 is a graph showing the effect of pH on extractions of various members of the cerium group, with Primene 81-R.
Figure 6:
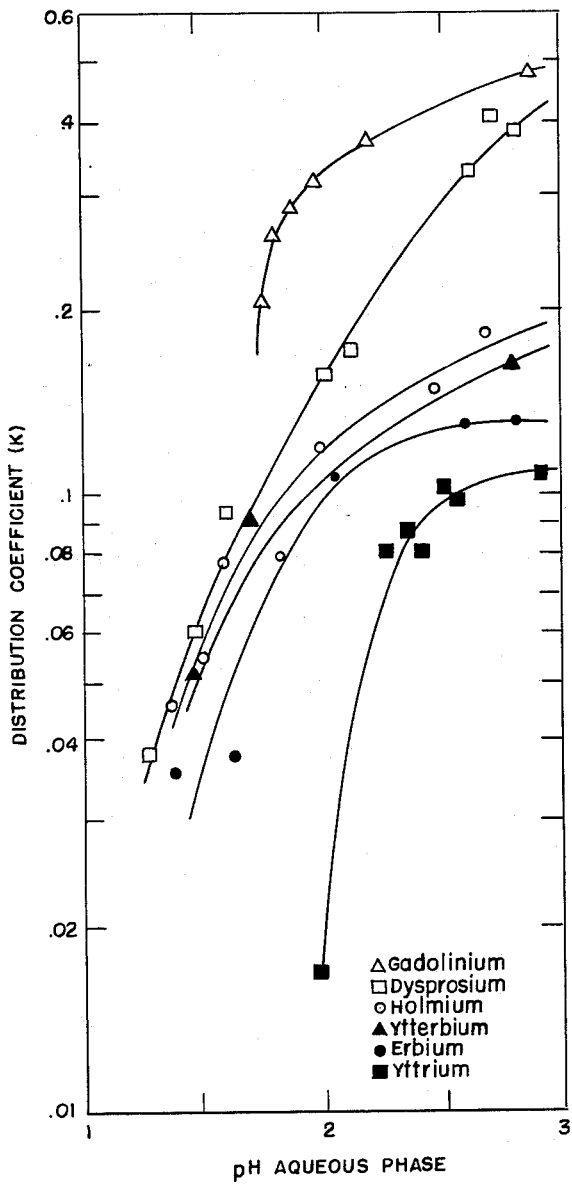
FIG. 6 is a graph showing the effect of pH on extractions of various members of the yttrium group with Primene 81-R.

The marked change of pH on the distribution coefficient is shown in FIGS. 5 and 6. Dysprosium is shown in both figures so they may be correlated. FIG. 5 shows a marked decrease in K at higher pH's of praseodymium.

In FIG. 6, the curves of holmium, ytterbium and erbium are close together, indicating that these would not be as readily separable as elements having curves further apart. However, operating the process in multiple stages in these cases would result in improved separation.

Figure 7:
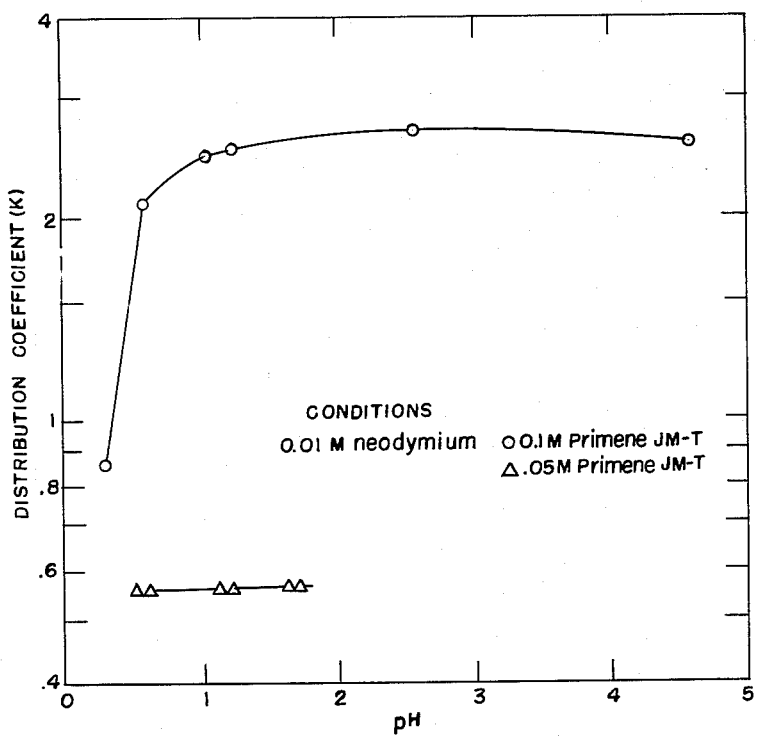
FIG. 7 shows the effect of pH on extraction of neodymium with Primene JM-T.

An almost flat response on certain portions of the curve showing variation of K with pH when using Primene JM-T is shown in FIG. 7.

The presence of different inorganic anions affects the extraction. For example, lanthanum was more difficult to extract in the presence of chloride and nitrate ions than in the presence of sulfate ions. Accordingly, the preferred mode of operation is to extract from a dilute

---

[1] The Armeens are marketed by Armour & Company, Chicago, Illinois. Armeen 12D is a mixture of primary alkyl amines consisting mainly of $C_{12}$ but containing $C_{14}$ and $C_{16}$. Armeen CD is a mixture of primary alkyl amines consisting mainly of $C_{12}$ and $C_{14}$ but containing $C_8$ to $C_{18}$ as well.
[2] 1-(3-ethylpentyl)-4-ethyloctylamine, marketed by Union Carbide Chemical Company, New York, N.Y.
[3] Marketed by Rohm and Haas, Philadelphia, Pa. Primene 81-R and JM-T are primary aliphatic amines with highly branched chains. 81-R is t-$C_{12}H_{25}NH_2$ to t-$C_{14}H_{29}NH_2$. JM-T is t-$C_{18}C_{37}NH_2$ to t-$C_{21}H_{43}NH_2$.

sulfuric acid solution of the rare earth, or to add sulfate ions to the aqueous solution.

Primene 81–R, under certain conditions, forms precipitates and gels in the organic phase with cerium III and lanthanum. At higher concentrations of amine (0.3 molar) and rare earth element (0.03 molar), precipitation became quite pronounced. Addition of octanol-2 or amyl alcohol often served to clear the organic phase, but at the expense of somewhat decreased extraction. Operation at greater dilutions avoids most of the difficulties. Also, a change of amine or solvent often removes the difficulties. Thus, Primene JM–T gave clearer phases with the lighter rare earths, and the substitution of hexane for kerosene resulted in improvement.

SEPARATION FACTOR

Separation factors ($\beta$) were determined with various rare earth pairs. Since the extent of actual separation of mixed rare earths was determined, these factors should be more representative of what would obtain in actual operation. The experimental procedures were the same as previously described except that the final volume of each phase was measured in a graduated cylinder.

The organic phase was stripped with N hydrochloric acid, which was then adjusted to a pH of 3 and the rare earth precipitated from solution as the oxalate. The weight of each element in the aqueous and organic phases were determined, and the distribution coefficient and separation factor calculated.

Table 1 gives the effect of various amines and two solvents on the separation factor in the case of three rare earth pairs. Four tests were made in each case.

All the distribution coefficients of the rare earth series form an approximate geometrical progression;

$$K_{La}, K_{Ce}, K_{Pr} \ldots K_{Yb}$$

where $K_{Ce} = S \cdot K_{La}$
$K_{Pr} = S^2 \cdot K_{La}$
$K_{La} = S^7 K_{Gd}$ By taking the $(Z_1-Z_n)$th root of the ratio of distribution coefficients of two rare earths where Z is the atomic number, the adjacent separation factor S, may be determined.

Table 2 shows the effect of changing concentrations of Primene 81–R on the separation of various rare earth element pairs. No significant variation in adjacent separation factors was obtained with concentration of amine.

Table 2.—*Effect of amine concentrations on separation of rare-earth elements* [1]

| Concentration of Primene 81–R, molar | Adjacent separation factor | | | | | |
|---|---|---|---|---|---|---|
| | Pr/Nd | Gd/Dy | Dy/Ho | Ho/Yb | Ho/Er | Er/Y |
| 0.1 | 1.2 | 1.1 | | | | |
| .2 | 1.1 | 1.2 | 1.4 | 1.4 | 1.7 | 1.1 |
| .3 | 1.2 | 1.1 | 1.8 | 1.2 | 1.5 | 1.2 |
| .5 | | | 1.8 | 1.6 | 1.4 | 1.1 |

[1] Constant conditions:
Cerium group, 0.03 molar $R_2O_3$ each element, pH 1.1.
Yttrium group, 0.01 molar $R_2O_3$ each element, pH 2.7.

Table 1.—*Effect of different amines on separation factors* [1]

| Rare-earth element pair | Amine | Kerosene | | Isopropyl ether | |
|---|---|---|---|---|---|
| | | Separation factor | Estimated standard deviation | Separation factor | Estimated standard deviation |
| Pr/Nd | Primene 81–R | 1.42 | 0.04 | 1.38 | 0.04 |
| Pr/Nd | Primene JM–T | 1.32 | .05 | 1.29 | .01 |
| Pr/Nd | BHDA | 1.24 | .13 | 1.18 | .05 |
| Nd/Sm | Primene 81–R | 2.09 | .03 | 2.18 | .03 |
| Nd/Sm | Primene JM–T | 1.62 | .03 | 1.51 | .05 |
| Nd/Sm | BHDA | 1.28 | .03 | 1.34 | .04 |
| Ce+++/La | Primene JM–T | 1.39 | .07 | 1.37 | .02 |
| Ce+++/La | BHDA | 1.41 | .07 | 1.45 | .06 |
| Ce+++/La | Primene 81–R | .67 | .09 | .76 | .05 |
| Ce+++/La [2] | Primene 81–R | 1.49 | .05 | | |

[1] Constant conditions: 0.015 molar rare-earth element, except 0.005 molar La and Ce when extracted with Primene 81–R in kerosene to avoid a gel-like organic layer. 0.2 molar amine with Pr, Nd, and Sm. 0.1 molar amine with La and Ce. pH 1.6.
[2] Kerosene with 10-percent 2-octanol.

It will be noted that in the Ce+++/La the separation factors obtained with Primene JM–T and BHDA were the reverse of those obtained with Primene 81–R. When octanol-2 was added to the kerosene-Primene 81–R combination to keep the organic layer fluid, the factor was also reversed (0.67 to 1.49). However, with isopropyl ether as the diluent, the order of extraction remained the same.

ADJACENT SEPARATION FACTORS

The effect of the variation of different factors may be conveniently illustrated employing the "adjacent separation factor."

As shown in Table 3, adjacent separation factors do not vary widely with change in rare-earth concentrations for the ranges studied.

Table 3.—*Effect of element concentration on the separation of rare-earth elements* [1]

| Concentration of rare-earth element molar | Adjacent separation factor | | | | | | |
|---|---|---|---|---|---|---|---|
| | Pr/Nd | Pr/Sm | Nd/Sm | Gd/Dy | Dy/Ho | Ho/Yb | Yb/Er |
| 0.01 | 1.3 | 1.6 | 1.5 | 1.2 | 1.8 | 1.2 | 1.3 |
| .02 | 1.2 | 1.7 | 1.4 | 1.2 | | 1.5 | 1.8 |
| .03 | 1.4 | 1.7 | 1.4 | 1.4 | 1.3 | 1.5 | |
| .04 | 1.2 | | | | | | |

[1] Constant conditions:
Cerium group, 0.2 molar Primene 81–R in kerosene, pH 1.5.
Yttrium group, 0.3 molar, Primene 81–R in kerosene, pH 2.7.

EFFECT OF pH

As indicated in FIGS. 5 and 6, pH is an important factor in determining the percent extraction. In general, a higher pH is required for the heavier rare earth elements than for the lighter ones. Thus, sixty percent of 0.01 molar praseodymium is extracted by 0.2 molar Primene 81–R at pH 1.5. Yttrium, which is grouped with the heavier rare earths could not be extracted at all under these conditions. On the other hand, seventy percent of 0.01 molar yttrium is extracted by 0.3 molar Primene 81-R at pH 7.0. A pH range of about 1 to 3 is satisfactory for the cerium group and about 2.7 to 7 for the yttrium group.

Table 4 shows the effect of pH on extraction of yttrium.

*Table 4.—Extraction of yttrium at high pH* [1]

| pH | Distribution coefficient | Extraction percent |
|---|---|---|
| 5.29 | 0.18 | 13 |
| 5.38 | .19 | 18 |
| 6.78 | 1.8 | 66 |
| 6.96 | 1.9 | 70 |

[1] Constant conditions: 0.01 molar $Y_2O_3$ and 0.3 molar Primene 81-R.

EXAMPLE 100 ml. of an aqueous solution consisting of rare earth sulfates obtained from euxenite, having a pH of 1.8 and a concentration of 43 grams equivalent $R_2O_3$ per 100 ml. was contacted in an extractor with 100 ml. of a 0.5 molar solution of Primene 81-R in kerosene. The kerosene solution was admitted at the bottom of the extractor which contained the solution of rare earths. Both phases were thoroughly mixed and the organic phase removed from the top of the extractor. Four aliquots were taken, and the results obtained are shown in the following tables.

*Table 5*

| Organic Phase | Volume, ml. | Weight of $R_2O_3$, g. |
|---|---|---|
| First aliquot | 20.9 | 0.239 |
| Second aliquot | 18.4 | .139 |
| Third aliquot | 23.0 | .182 |
| Fourth aliquot | 35.5 | .142 |
| Aqueous Phase: Raffinate | 110.8 | 3.604 | of the yttrium group of rare earths; increasing in the order Gd>Gy>Yb>Er>Y and for members of the cerium group of rare earths, increasing in the order Ce>Pr>Nd>Sm whereby the individual rare earths are distributed between the extract phase and raffinate phase in varying concentrations based on their respective distribution coefficients, said extract and raffinate phases thereby becoming relatively enriched with respect to individual rare earths as compared to their concentrations in the initial aqueous sulfate solution, separating the extract phase from said raffinate phase and recovering the rare earths from said phases.

2. The method of claim 1 wherein the molar extraction of rare earth in the initial aqueous sulfate solution is 0.005 to 0.05 and the sulfate ion is 0.05 molar.

3. The method of claim 2 wherein a member of the class consisting of octanol-2 and amyl alcohol is added to the organic extract phase to control the formation of gels or precipitates.

4. The method of claim 2 wherein the pH is from about 1.0 to about 3.0 and the rare earths are in the cerium group.

5. The method of claim 2 wherein the pH is from about 2.7 to about 7.0 and the rare earths are in the yttrium group.

6. The method of claim 4 wherein the amine is a straight chain dodecylamine.

7. The method of claim 5 wherein the amine is a straight chain dodecylamine.

8. The method of claim 4 wherein the solvent is kerosene.

9. The method of claim 5 wherein the solvent is kerosene.

10. The method of claim 9 wherein the enriched rare earths of the extract and raffinate phases are respectively further fractionally separated by repeating the amine contacting steps set forth therein.

*Table 6.—Composition* [1] *of rare-earth solutions with solvent extraction*

| Feed | La | Ce | Pr | Nd | Sm | Gd | Tb | Y | Dg | Ho | Er | Yb |
|---|---|---|---|---|---|---|---|---|---|---|---|---|
|  | 3.1 | 5.8 | 0.8 | 2.7 | 2.3 | 5.0 | 1.3 | 52 | 13.0 | 2.0 | 7.5 | 6.0 |
| Aliquots: |  |  |  |  |  |  |  |  |  |  |  |  |
| First | 23.0 | 40.0 | 3.3 | 10.1 | 2.8 | 1.4 | 0.4 | 10 | 2.0 | 0.3 | 0.8 | 0.7 |
| Second | 16.8 | 32.0 | 3.2 | 13.1 | 5.7 | 3.4 | 0.8 | 18 | 4.2 | 0.6 | 1.9 | 1.5 |
| Third | 8.0 | 16.4 | 2.2 | 10.9 | 7.0 | 7.5 | 1.6 | 27 | 9.2 | 1.3 | 3.8 | 3.2 |
| Fourth | 5.0 | 9.4 | 1.4 | 7.2 | 5.5 | 8.3 | 2.1 | 35 | 12.8 | 1.7 | 6.5 | 5.4 |
| Aqueous Phase | 0.5 | 1.0 | 0.1 | 1.4 | 2.0 | 5.3 | 1.6 | 57 | 11.4 | 2.2 | 8.0 | 6.7 |

[1] Composition expressed as percent oxide of element.

It is obvious that modifications and variations may be introduced in the practice of this invention by persons skilled in the art without affecting the essence thereof.

What is claimed is:

1. A method for the fractional separation of rare earths from a mixture thereof which comprises contacting an initial aqueous sulfate solution of the rare earth mixture having a pH of from about 1.0 to about 7.5 with a member of the class consisting of (1) at least one amine having the formula $RNH_2$ wherein R is an alkyl group of from about 12 to 21 carbon atoms, and (2) N-benzylheptadecylamine, said amine being dissolved in an organic, water immiscible inert solvent compatible with the other components present, to form an organic extract phase and an aqueous raffinate phase, each of the rare earths having a different percentage distribution between the organic phase and the aqueoous phase expressed as the ratio of the concentration of the rare earth in the organic phases to the concentration in the aqueous phase, said ratio being the distribution coefficient K, said coefficient, for members

References Cited by the Examiner

UNITED STATES PATENTS

| 2,689,221 | 9/1954 | Bray | 252—327 X |
| 2,877,250 | 3/1959 | Brown | 231—312 X |
| 2,990,244 | 1/1961 | Brown | 23—312 |
| 3,047,360 | 7/1962 | Sheppard | 23—312 X |
| 3,110,556 | 11/1963 | Peppard | 23—312 X |

OTHER REFERENCES

Bauer: "Liquid-Liquid Extraction of Rare-Earth Elements," Bureau of Mines Report of Investigations 5570, 1960, pages 1–10.

Coleman et al.: "Proceedings of International Conference on Peaceful Uses of Atomic Energy," vol. 28, 1948, pages 278–288.

NORMAN YUDKOFF, *Primary Examiner.*

JAMES H. TAYMAN, JR., *Examiner.*

S. EMERY, *Assistant Examiner.*